United States Patent
Li (10) Patent No.: US 11,043,982 B1
(45) Date of Patent: Jun. 22, 2021

(54) DATA TRANSMITTING CIRCUIT, DATA RECEIVING CIRCUIT AND DATA TRANSFERRING APPARATUS

(71) Applicant: TENDYRON CORPORATION, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 16/762,815

(22) PCT Filed: Nov. 27, 2018

(86) PCT No.: PCT/CN2018/117673
§ 371 (c)(1),
(2) Date: May 8, 2020

(87) PCT Pub. No.: WO2019/105338
PCT Pub. Date: Jun. 6, 2019

(30) Foreign Application Priority Data

Dec. 1, 2017 (CN) .......................... 201711249309.4
Dec. 1, 2017 (CN) .......................... 201711251098.8

(51) Int. Cl.
*H04W 76/27* (2018.01)
*H04B 1/40* (2015.01)
*H04B 1/04* (2006.01)

(52) U.S. Cl.
CPC .................. *H04B 1/40* (2013.01); *H04B 1/04* (2013.01); *H04W 76/27* (2018.02)

(58) Field of Classification Search
CPC ............. H04L 67/1097; H04L 12/4633; H04L 1/1685; H04L 1/1812; H04L 41/22;
(Continued)

(56) References Cited

U.S. PATENT DOCUMENTS

| 7,359,433 B1 | 4/2008 | Culca | |
| 2008/0021219 A1* | 1/2008 | Puentener | B01J 31/2269 546/4 |
| 2009/0096413 A1* | 4/2009 | Partovi | H02J 50/12 320/108 |
| 2015/0365003 A1* | 12/2015 | Sadwick | H02M 3/28 363/21.01 |

(Continued)

FOREIGN PATENT DOCUMENTS

| CN | 103683437 | 3/2014 |
| CN | 103683530 | 3/2014 |

(Continued)

OTHER PUBLICATIONS

International Search Report dated Feb. 27, 2019 for PCT/CN2018/117673 with English Translation.

*Primary Examiner* — Eva Y Puente
(74) *Attorney, Agent, or Firm* — Martin & Ferraro, LLP (57) ABSTRACT

The present invention provides a data transmitting circuit, a data receiving circuit and a data transferring apparatus. In one of the implementations of the data transmitting circuit, the first end of the primary coil of a transformer is connected to a first power supply interface, and the second end of the primary coil of the transformer is connected to the first end of a current limiting module and the first end of a first capacitor respectively; the first end of the secondary coil of the transformer is connected to a second power supply interface, and the second end of the secondary coil of the transformer is connected to a transmitting interface; the second end of the current limiting module and the second end of the first capacitor are both connected to the input end of a switch module.

10 Claims, 3 Drawing Sheets

(58) Field of Classification Search
CPC ..... H04L 43/16; H04L 47/193; H04L 47/283; H04L 5/001; H04L 5/0051; H04L 5/0053; H04L 5/0094; H04W 76/27; H04W 72/042; H04W 68/005; H04W 88/02; H04W 88/08; H04W 12/06; H04W 76/14; H04W 80/02; H04W 84/042; H04W 24/10; H04W 56/001; H04W 74/0833; H04W 76/25; H01L 2924/00; H01L 2224/48091; H01L 2924/01015; H01L 2924/01047; H01L 2924/1305; H01L 2924/13091; H01L 2924/1461; H01L 2924/181; H01L 2924/30107; H01L 2924/3011
USPC .......................................... 375/295; 320/137
See application file for complete search history.

(56) References Cited

U.S. PATENT DOCUMENTS

2017/0063432 A1* 3/2017 Martin ................. H04B 5/0093
2017/0086281 A1* 3/2017 Avrahamy ............. H05B 47/19

FOREIGN PATENT DOCUMENTS

| CN | 105471569 | 4/2016 |
| --- | --- | --- |
| CN | 106331563 | 1/2017 |
| CN | 107968665 | 4/2018 |
| CN | 107979381 | 5/2018 |
| CN | 108233957 | 6/2018 |
| CN | 207588847 | 7/2018 |
| CN | 207720118 | 8/2018 |

* cited by examiner

DATA TRANSMITTING CIRCUIT, DATA RECEIVING CIRCUIT AND DATA TRANSFERRING APPARATUS

CROSS-REFERENCE TO RELATED APPLICATION

The present application is a US national phase application of International Application No. PCT/CN2018/117673, filed on Nov. 27, 2018, which claims priorities to Chinese Patent Application No. 201711249309.4, entitled "Data Transmitting Circuit and Apparatus, and Data Receiving Circuit and Apparatus", filed with China National Intellectual Property Administration on Dec. 1, 2017 by TENDYRON CORPORATION and Chinese Patent Application No. 201711251098.8, entitled "Data Transmitting Circuit and Apparatus" filed with China National Intellectual Property Administration on Dec. 1, 2017 by TENDYRON CORPORATION.

FIELD

The present disclosure relates to the field of electronic technologies, and more particularly, to a data transmitting circuit, a data receiving circuit and a data transferring apparatus.

BACKGROUND

At present, when implementing medium-distance signal transmission, there is usually a certain distance between the location of a data transmitting apparatus and the location of a data receiving apparatus. Consequently, whether a data transmitting circuit and a data receiving circuit are properly designed will affect stability and quality of signal transmission.

SUMMARY

The present disclosure aims at providing a new type of data transmitting circuit and data receiving circuit.

Embodiments of the present disclosure provide a data transmitting circuit, including: a first power supply interface configured to provide a first direct voltage, a second power supply interface configured to provide a second direct voltage, a transmitting interface, a master control chip, a transformer, a current limiting module, a first capacitor and a switch module; in which, a first end of a primary coil of the transformer is connected to the first power supply interface, a second end of the primary coil of the transformer is connected to a first end of the current limiting module and a first end of the first capacitor respectively, a first end of a secondary coil of the transformer is connected to the second power supply interface, and a second end of the secondary coil of the transformer is connected to the transmitting interface; and a second end of the current limiting module and a second end of the first capacitor are connected to an input end of the switch module; or, the first end of the primary coil of the transformer is connected to the first end of the current limiting module and the first end of the first capacitor respectively, the second end of the current limiting module and the second end of the first capacitor are connected to the first power supply interface, the second end of the primary coil of the transformer is connected to the input end of the switch module, the first end of the secondary coil of the transformer is connected to the second power supply interface, and the second end of the secondary coil of the transformer is connected to the transmitting interface; an output end of the switch module is grounded, and a control end of the switch module is connected to the master control chip; the master control chip is configured to transmit a control signal to the control end of the switch module when the data transmitting circuit transmits a data signal to the transmitting interface; and the switch module is configured to switch on or off a circuit path between the input end and the output end of the switch module when receiving the control signal transmitted by the master control chip.

Embodiments of the present disclosure provide a data receiving circuit, including: a receiving interface, a first voltage dividing module, a voltage reduction module, a second voltage dividing module, a second capacitor; a filtering module; a comparator; and a master control chip; in which a first end of the first voltage dividing module and a first end of the second capacitor are connected to the receiving interface; a second end of the first voltage dividing module and a second end of the second capacitor are connected to a first common connection end, the first common connection end is connected to an input end of the filtering module, an output end of the filtering module is connected to a negative input end of the comparator, and a ground end of the filtering module is grounded; the first common connection end is connected to an input end of the voltage reduction module; an output end of the voltage reduction module is connected to a second common connection end, and the second common connection end is connected to a positive input end of the comparator; the second common connection end is connected to a first end of the second voltage dividing module; a second end of the second voltage dividing module is grounded; the comparator is configured to compare a voltage of the positive input end with a voltage of the negative input end when the data receiving circuit receives a data signal through the receiving interface, and to output a comparison result signal to the master control chip through an output end of the comparator; the master control chip is connected to the output end of the comparator, and configured to receive the comparison result signal output from the output end of the comparator.

Embodiments of the present disclosure provide a data transferring apparatus, including a data transmitting circuit and a data receiving circuit. The data transmitting circuit may include: a first power supply interface configured to provide a first direct voltage, a second power supply interface configured to provide a second direct voltage, a transmitting interface, a master control chip, a transformer, a current limiting module, a first capacitor and a switch module; in which, a first end of a primary coil of the transformer is connected to the first power supply interface, a second end of the primary coil of the transformer is connected to a first end of the current limiting module and a first end of the first capacitor respectively, a first end of a secondary coil of the transformer is connected to the second power supply interface, and a second end of the secondary coil of the transformer is connected to the transmitting interface; and a second end of the current limiting module and a second end of the first capacitor are connected to an input end of the switch module; or, the first end of the primary coil of the transformer is connected to the first end of the current limiting module and the first end of the first capacitor respectively, the second end of the current limiting module and the second end of the first capacitor are connected to the first power supply interface, the second end of the primary coil of the transformer is connected to the input end of the switch module, the first end of the secondary coil of the transformer is connected to the second power supply interface, and the second end of the secondary coil of the transformer is connected to the transmitting interface; an output end of the switch module is grounded, and a control end of the switch module is connected to the master control chip; the master control chip is configured to transmit a control signal to the control end of the switch module when the data transmitting circuit transmits a data signal to the transmitting interface; and the switch module is configured to switch on or off a circuit path between the input end and the output end of the switch module when receiving the control signal transmitted by the master control chip. The data receiving circuit may include: a receiving interface, a first voltage dividing module, a voltage reduction module, a second voltage dividing module, a second capacitor, a filtering module, a comparator, and a master control chip; in which, a first end of the first voltage dividing module and a first end of the second capacitor are connected to the receiving interface; a second end of the first voltage dividing module and a second end of the second capacitor are connected to a first common connection end, the first common connection end is connected to an input end of the filtering module, an output end of the filtering module is connected to a negative input end of the comparator, and a ground end of the filtering module is grounded; the first common connection end is further connected to an input end of the voltage reduction module; an output end of the voltage reduction module is connected to a second common connection end, and the second common connection end is connected to a positive input end of the comparator; the second common connection end is further connected to a first end of the second voltage dividing module; a second end of the second voltage dividing module is grounded; the comparator is configured to compare a voltage of the positive input end with a voltage of the negative input end when the data receiving circuit receives a data signal through the receiving interface, and to output a comparison result signal to the master control chip through an output end of the comparator; the master control chip is connected to the output end of the comparator, and configured to receive the comparison result signal output from the output end of the comparator.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

In the following, the technical solutions in the embodiments of the present disclosure will be clearly and completely described with reference to the accompanying drawings in the embodiments of the present disclosure. Obviously, the described embodiments are only a part of the embodiments of the present disclosure, rather than all the embodiments. Based on the embodiments of the present disclosure, all other embodiments obtained by a person skilled in the art without creative labor shall fall within the protection scope of the present disclosure.

The embodiments of the present disclosure will be described in detail below with reference to the accompanying drawings.

Figure 1:
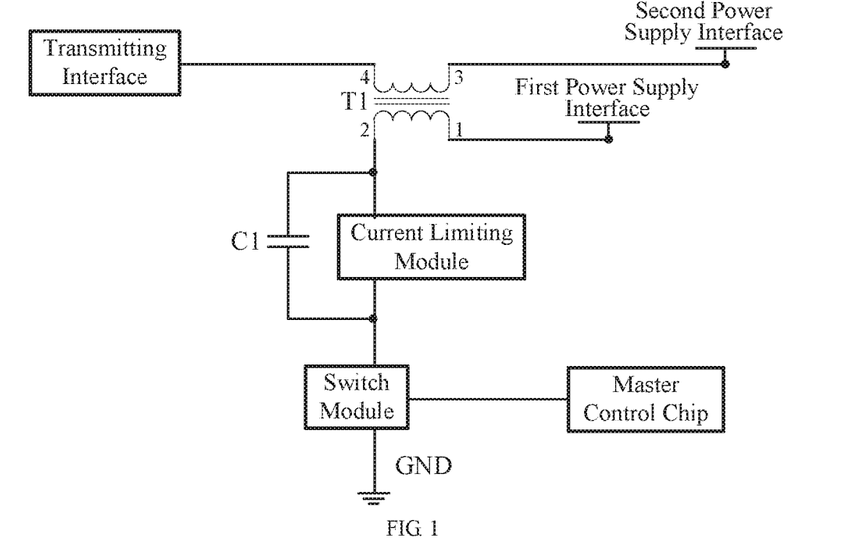
FIG. 1 is a schematic diagram of a data transmitting circuit according to an embodiment of the present disclosure.

An embodiment provides a data transmitting circuit. As shown in FIG. 1, the data transmitting circuit includes: a first power supply interface configured to provide a first direct voltage, a second power supply interface configured to provide a second direct voltage, a transmitting interface, a master control chip, a transformer T1, a current limiting module, a first capacitor C1 and a switch module.

A first end (pin 1 of T1) of a primary coil of the transformer (T1) is connected to the first power supply interface, a second end (pin 2 of T1) of the primary coil of the transformer (T1) is respectively connected to a first end of the current limiting module and a first end of the first capacitor (C1), a first end (pin 3 of T1) of a secondary coil of the transformer (T1) is connected to the second power supply interface, and a second end (pin 4 of T1) of the secondary coil of the transformer (T1) is connected to the transmitting interface.

A second end of the current limiting module and a second end of the first capacitor (C1) are connected to an input end of the switch module.

An output end of the switch module is grounded (GNB), and a control end of the switch module is connected to the master control chip.

The master control chip is configured to transmit a control signal to the control end of the switch module when the data transmitting circuit transmits a data signal to the transmitting interface.

The switch module is configured to switch on or off a circuit path between the input end and the output end of the switch module when receiving the control signal transmitted by the master control chip.

Figure 2:
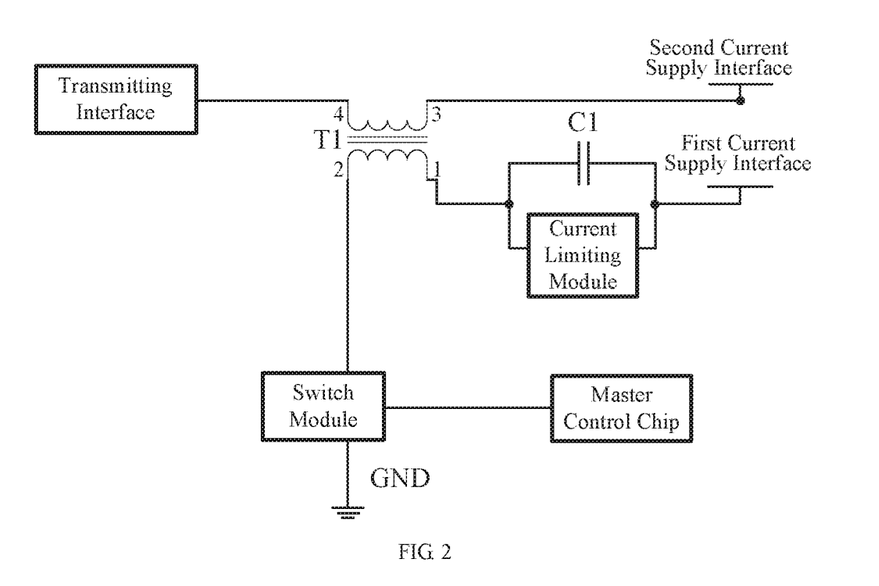
FIG. 2 is a schematic diagram of a data transmitting circuit according to another embodiment of the present disclosure.

Another embodiment of the present disclosure provides a data transmitting circuit. As shown in FIG. 2, the data transmitting circuit includes: the first power supply interface configured to provide the first direct voltage, the second power supply interface configured to provide the second direct voltage, the transmitting interface, the master control chip, the transformer T1, the current limiting module, the first capacitor C1 and the switch module.

The first end (pin 1 of T1) of the primary coil of the transformer (T1) is respectively connected to the first end of the current limiting module and the first end of the first capacitor (C1), the second end of the current limiting module and the second end of the first capacitor (C1) are connected to the first power supply interface, the second end (pin 2 of T1) of the primary coil of the transformer (T1) is connected to the input end of the switch module, the first end (pin 3 of T1) of the secondary coil of the transformer (T1)

is connected to the second power supply interface, and the second end (pin 4 of T1) of the secondary coil of the transformer (T1) is connected to the transmitting interface.

The output end of the switch module is grounded (GND), and the control end of the switch module is connected to the master control chip.

The master control chip is configured to transmit the control signal to the control end of the switch module when the data transmitting circuit transmits the data signal to the transmitting interface.

The switch module is configured to switch on or off the circuit path between the input end and the output end of the switch module when receiving the control signal transmitted by the master control chip.

According to the data transmitting circuit provided in this embodiment, when the switch module switches off the circuit path between the input end and the output end of the switch module, no current flows through the primary coil of the transformer, and a signal transmitted by the transmitting interface is a signal corresponding to the first direct voltage. When the switch module switches on the circuit path between the input end and the output end of the switch module, a circuit path is formed between the primary coil of the transformer and the ground end. Consequently, a current is generated in the primary coil of the transformer, and further a current is also generated in the secondary coil of the transformer. At this time, the signal generated by the secondary coil of the transformer will be coupled with the signal generated by the second direct voltage to form a signal different from the first direct voltage (a voltage value of the signal different from the first direct voltage is non-zero). The master control chip transmits the control signal according to the data to be transmitted to control the switch module to switch on or off, and then alternately transmits the signal corresponding to the first direct voltage and the signal different from the first direct voltage at the transmitting interface. In other words, when transmitting data, the transmitting interface uses an alternating current signal to send the data. For example, the transmitting interface transmits data 1 with the signal corresponding to the first direct voltage, and transmits data 0 with the signal different from the first direct voltage; or transmits the data 0 with the signal corresponding to the first direct voltage, and transmits the data 1 with the signal different from the first direct voltage. The data transmitting circuit according to this embodiment may ensure stability and quality of signal transmission.

In this embodiment, since voltage values of the signal corresponding to the first direct voltage and the signal different from the first direct voltage alternately transmitted by the transmitting interface are non-zero, that is, the voltage values of the data signals transmitted by the transmitting interface are non-zero. Compared with pulling a voltage value down to zero during data signal transmission in the prior art, on the one hand, continuous power supply to the data receiving apparatus may be achieved with the data signal transmitted, and on the other hand, the efficiency of data transmission may be improved, and the time required for data transmission may be shortened.

In addition, when transmitting data using the data transmitting circuit provided in this embodiment, the second power supply interface, which may be a VCC, is connected to a pin to realize data transmission, that is, the pin is connected to a power supply line to realize data transmission, so that both the power supply to the data transmitting apparatus and the data transmission are realized on one line.

As an optional implementation of the embodiment, the signal generated by the secondary coil of the transformer will be coupled with the signal generated by the second direct voltage to form a signal different from the first direct voltage, i.e., to form a signal higher than the first direct voltage, or to form a signal lower than the first direct voltage. The signal different from the first direct voltage may be set according to different needs of an application, and is not limited here.

As an optional implementation of the embodiment, the master control chip transmits the control signal to the control end of the switch module. For example, in a default state, the control end of the switch module maintains a signal of either a high level or a low level to keep the switch module in a switch-on state, and the circuit path is switched off at this time. When the switch needs to be switched off to connect the circuit path, the control signal transmitted is another signal of the high level and low level. In detail, switching off the switch with the high level or the low level may be determined according to the type of components used when the switch module is implemented, and there is no limitation here.

As an optional implementation of the embodiment, the foregoing data transmitting circuit may be applied to medium-distance transmission. For example, an exemplary application scenario where: an electronic device provided with a wireless card reader and the data transmitting circuit reads card information at a certain distance. Of course, the data transmitting circuit may also be applied to short-distance transmission. For example, a scene where the electronic device is provided with the data transmitting circuit and a two-wire communication interface, and two such electronic devices transmit data via the two-wire communication interface. There are no restrictions here.

As an optional implementation of the embodiment, as shown in FIG. 2, the first power supply interface configured to provide the first direct voltage may be the first power supply interface connected to a DC power supply VCC; and the second power supply interface configured to provide the second direct voltage may be the second power supply interface connected to a chip operating voltage VDD.

As an optional implementation of the embodiment, the voltage at the first power supply interface may be greater than the voltage at the second power supply interface, and the transmitted signal may be amplified, thereby realizing the transmission of signals at medium and long distances. For example, the voltage at the first power supply interface is 12 v, and the voltage at the second power supply interface is 5 v. Of course, according to the needs of practical applications, the voltage at the first power supply interface may also be equal to or less than the voltage at the second power supply interface.

Figure 3:
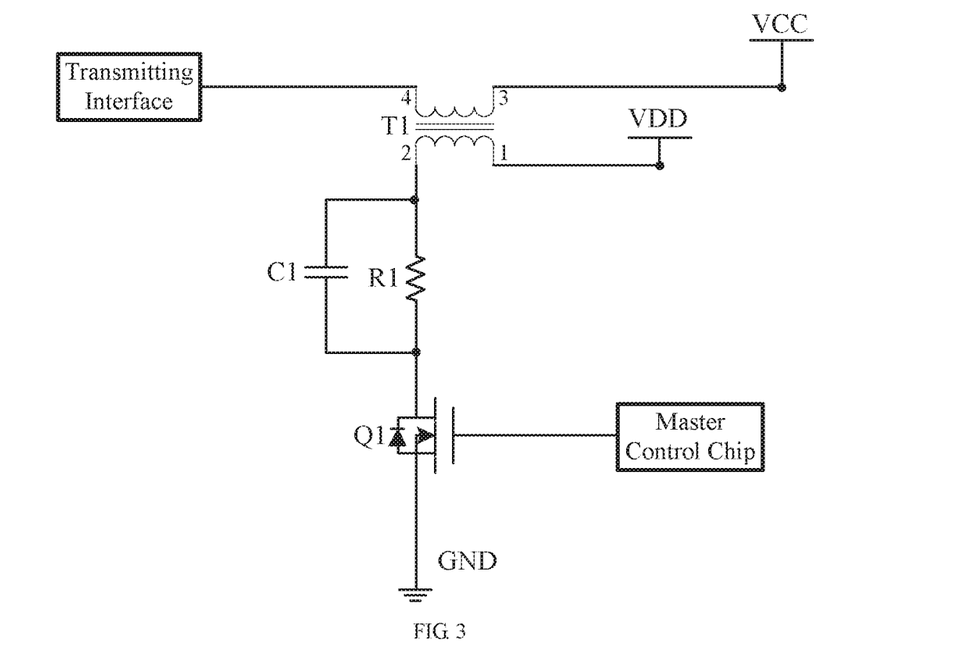
FIG. 3 is another schematic diagram of the data transmitting circuit as shown in FIG. 1 according to an embodiment of the present disclosure.
Figure 4:
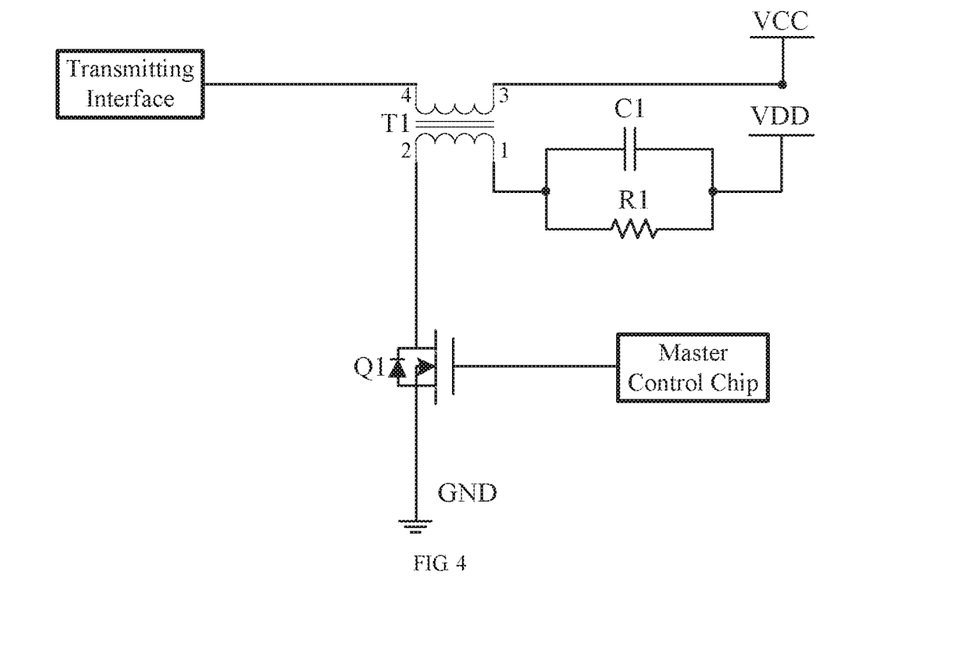
FIG. 4 is another schematic diagram of the data transmitting circuit as shown in FIG. 2 according to an embodiment of the present disclosure.

As an optional implementation of the embodiment, another schematic diagram of a data transmitting circuit shown in FIG. 3 or FIG. 4 is provided. The data transmitting circuit shown in FIG. 3 corresponds to the data transmitting circuit shown in FIG. 1, and the data transmitting circuit shown in FIG. 4 corresponds to the data transmitting circuit shown in FIG. 2. The current limiting module includes a first resistor R1 for current-limiting protection when the circuit forms a path, thereby avoiding short circuit. When the first resistor is implemented, the first resistor may include one resistor or several parallel resistors or several series resistors, which is not limited herein.

As an optional implementation of the embodiment; another schematic diagram of a data transmitting circuit shown in FIG. 3 or FIG. 4 is provided. The switch module includes a MOS transistor Q1 or a triode. For example; when the switch module uses an NMOS transistor, a drain D of the NMOS transistor is used as the input end of the switch module, a source S of the NMOS transistor is used as the output end of the switch module, and a gate G of the NMOS transistor is used as the control end of the switch module. For another example, when the switch module uses a PMOS transistor, a source S of the PMOS transistor is used as the input end of the switch module, a drain D of the PMOS transistor is used as the output end of the switch module, and a gate G of the PMOS transistor is used as the control end of the switch module. For another example, the switch module may also use a triode and other components that may implement the switch-on or -off function; which is not limited here.

As an optional implementation of the embodiment, a glitch filtering module; such as a diode, is provided between the first end and the second end of the primary coil of the transformer, and is configured to filter glitch signals generated in the circuit. Of course, when current signals are stable in the circuit, the glitch filtering module may not be provided.

As an optional implementation of the embodiment, a filtering module is provided between the first end and the second end of the secondary coil of the transformer, for example, three components including an inductor, a resistor and a diode are connected, or the inductor, the resistor and the diode are connected in parallel; to filter glitch signals generated in the circuit. Of course, when current signals are stable in the circuit, the glitch filtering module may not be provided.

Figure 5:
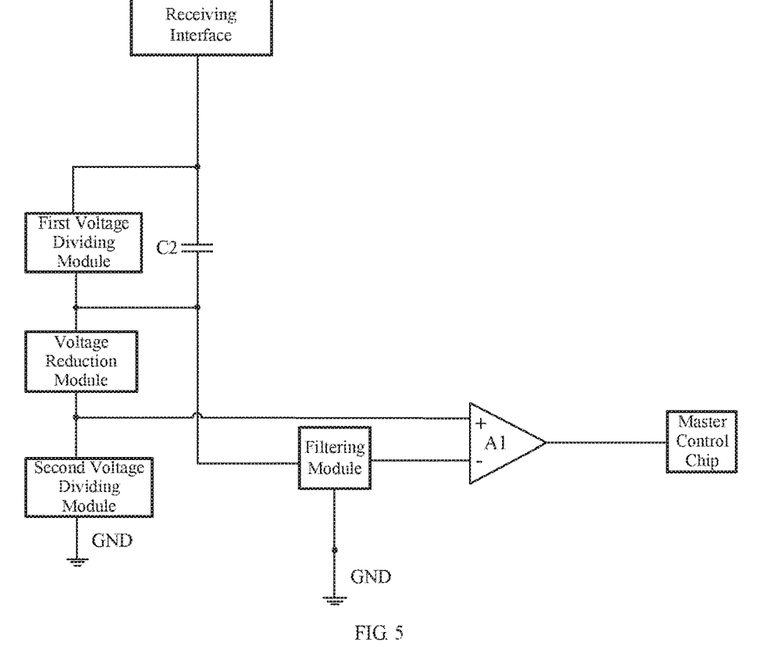
FIG. 5 is a schematic diagram of a data receiving circuit according to an embodiment of the present disclosure.

An embodiment further provides a data receiving circuit, as shown in FIG. 5, including: a receiving interface, a first voltage dividing module, a voltage reduction module, a second voltage dividing module, a second capacitor C2, a filtering module, a comparator A1; and a master control chip.

A first end of the first voltage dividing module and a first end of the second capacitor C2 are connected to the receiving interface.

A second end of the first voltage dividing module and a second end of the second capacitor C2 are connected to a first common connection end, the first common connection end is connected to an input end of the filtering module, an output end of the filtering module is connected to a negative input end of the comparator A1, and a ground end of the filtering module is grounded (GND).

The first common connection end is connected to an input end of the voltage reduction module.

An output end of the voltage reduction module is connected to a second common connection end, and the second common connection end is connected to a positive input end of the comparator A1.

The second common connection end is connected to a first end of the second voltage dividing module.

A second end of the second voltage dividing module is grounded (GND).

The comparator A1 is configured to compare a voltage of the positive input end with a voltage of the negative input end when the data receiving circuit receives a data signal through the receiving interface, and to output a comparison result signal to the master control chip through an output end of the comparator A1.

The master control chip is connected to the output end of the comparator A1, and configured to receive the comparison result signal output from the output end of the comparator A1.

According to the data receiving circuit provided in the embodiment, when the signal received by the receiving interface is an alternating current signal, the signal received by the positive input end of the comparator is also an alternating current signal. As the negative input end of the comparator is provided with the filtering module, the alternating current signal will be filtered to obtain a direct current signal, so the negative input end of the comparator will receive the direct current signal. When the voltage of the alternating current signal received by the positive input of the comparator is greater than the voltage of the direct current signal received by the negative input of the comparator, the comparison result signal output by the comparator is high level. When the voltage of the alternating current signal received by the positive input of the comparator is less than the voltage of the direct current signal received by the negative input of the comparator, the comparison result signal output by the comparator is low level, thereby realizing the reception of the data signal. The new-type data receiving circuit according to the embodiment may ensure stability and quality of signal reception.

Figure 6:
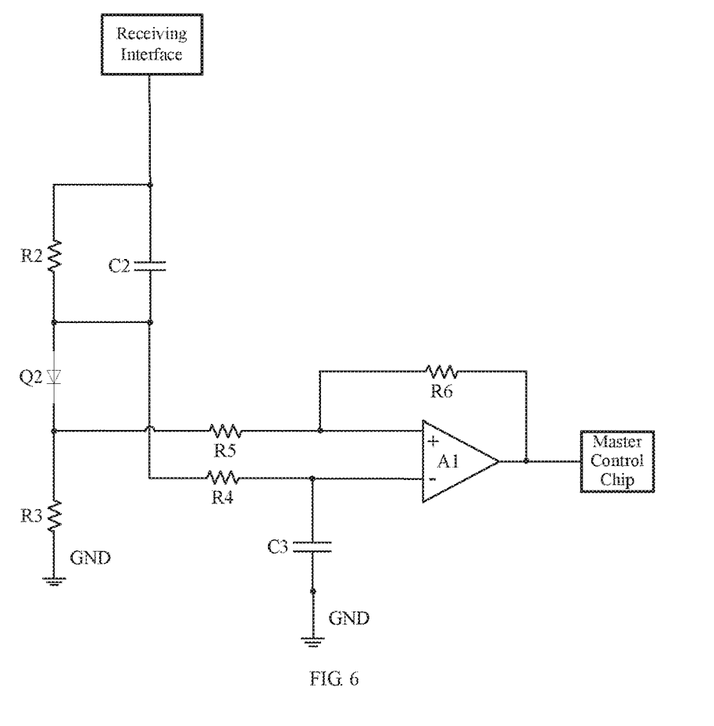
FIG. 6 is another schematic diagram of a data receiving circuit according to an embodiment of the present disclosure.

As an optional implementation of the embodiment, as shown in FIG. 6, the first voltage dividing module includes a second resistor R2, the voltage reduction module includes a diode Q2, and the second voltage dividing module includes a third resistor R3. For the data receiving circuit provided in the embodiment, when a signal is received by the receiving interface, the voltage of the received signal may be reduced to a voltage range supported by the comparator through the first voltage dividing module, the voltage reduction module, and the second voltage dividing module, thereby ensuring that the comparator may perform a normal comparison to output the comparison result signal.

As an optional implementation of the embodiment, as shown in FIG. 6, the filtering module includes: a fourth resistor R4 and a third capacitor C3. A first end of the fourth resistor R4 is connected to the input end of the filtering module, and a second end of the fourth resistor R4 is connected to the output end of the filtering module; and a first end of the third capacitor C3 is connected to the output end of the filtering module, and a second end of the third capacitor C3 is connected to the ground end of the filtering module. In the embodiment, the filtering module may rectify and filter the alternating current signal to obtain a relatively smooth direct current signal.

As an optional implementation of the embodiment, as shown in FIG. 6, the positive input end and the output end of the comparator A1 are further connected with an anti-shaking module. The anti-shaking module includes a resistor R6 configured to prevent a circuit from shaking. Of course, under the premise of stable circuit, it is unnecessary to set the anti-shaking module.

An embodiment further provides a data transmitting apparatus, including the data transmitting circuit shown in FIG. 1 or FIG. 2. The data sending apparatus may be an information reading device, such as a card reader, or an electronic device (such as a personal computer (PC) or a mobile phone) that needs to read information from an electronic signature tool.

An embodiment further provides a data receiving apparatus, including the data receiving circuit shown in FIG. 5 or 6. The data receiving apparatus may be an electronic device carrying information, such as a smart card, an electronic signature tool, and the like.

An embodiment further provides a data transferring apparatus, including the data transmitting circuit shown in FIG. 1 or FIG. 2 and the data receiving circuit shown in FIG. 5 or 6. The data transferring apparatus may be, for example, a card reader and a smart card that cooperate with each other, a host computer (such as a PC, a mobile phone, and the like) and an electronic signature tool.

As an optional implementation of the embodiment, the transmitting interface and the receiving interface are located in one interface. For example, the data transferring apparatus supports the two-wire communication interface. One pin in the two-wire communication interface may be used as a transmitting interface or a receiving interface, and the other pin of the two-wire communication interface is grounded, so that data may be transmitted and received on the same communication interface.

At the same time, in the data transferring apparatus according to the embodiment, a pin for implementing data transmission and reception is connected to the second power supply interface, and the second power supply interface may be the VCC, that is, the pin for implementing the data transmission and reception is connected to the power supply line, so that both power supply and data transmission and reception are realized on one line.

Of course, the transmitting interface may be separated from the receiving interface, and specific arrangements may be made according to application requirements.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure. For those skilled in the art, changes, alternatives, and modifications can be made to the embodiments without departing from spirit, principles and scope of the present disclosure. The scope of the present disclosure is defined by the attached claims and their equivalents.

What is claimed is:

1. A data transmitting circuit, comprising:
   a first power supply interface configured to provide a first direct voltage, a second power supply interface configured to provide a second direct voltage, a transmitting interface, a master control chip, a transformer, a current limiting module, a first capacitor and a switch module;
   wherein, a first end of a primary coil of the transformer is connected to the first power supply interface, a second end of the primary coil of the transformer is connected to a first end of the current limiting module and a first end of the first capacitor respectively, a first end of a secondary coil of the transformer is connected to the second power supply interface, and a second end of the secondary coil of the transformer is connected to the transmitting interface; and a second end of the current limiting module and a second end of the first capacitor are connected to an input end of the switch module; or, the first end of the primary coil of the transformer is connected to the first end of the current limiting module and the first end of the first capacitor respectively, the second end of the current limiting module and the second end of the first capacitor are connected to the first power supply interface, the second end of the primary coil of the transformer is connected to the input end of the switch module, the first end of the secondary coil of the transformer is connected to the second power supply interface, and the second end of the secondary coil of the transformer is connected to the transmitting interface;
   an output end of the switch module is grounded, and a control end of the switch module is connected to the master control chip;
   the master control chip is configured to transmit a control signal to the control end of the switch module when the data transmitting circuit transmits a data signal to the transmitting interface; and
   the switch module is configured to switch on or off a circuit path between the input end and the output end of the switch module when receiving the control signal transmitted by the master control chip.

2. The data transmitting circuit of claim 1, wherein the current limiting module comprises a first resistor, and the switch module comprises a MOS transistor or a triode.

3. A data receiving circuit, comprising:
   a receiving interface, a first voltage dividing module, a voltage reduction module, a second voltage dividing module, a second capacitor, a filtering module, a comparator, and a master control chip;
   wherein a first end of the first voltage dividing module and a first end of the second capacitor are connected to the receiving interface;
   a second end of the first voltage dividing module and a second end of the second capacitor are connected to a first common connection end, the first common connection end is connected to an input end of the filtering module, an output end of the filtering module is connected to a negative input end of the comparator, and a ground end of the filtering module is grounded;
   the first common connection end is further connected to an input end of the voltage reduction module;
   an output end of the voltage reduction module is connected to a second common connection end, and the second common connection end is connected to a positive input end of the comparator;
   the second common connection end is further connected to a first end of the second voltage dividing module;
   a second end of the second voltage dividing module is grounded;
   the comparator is configured to compare a voltage of the positive input end with a voltage of the negative input end when the data receiving circuit receives a data signal through the receiving interface, and to output a comparison result signal to the master control chip through an output end of the comparator;
   the master control chip is connected to the output end of the comparator, and configured to receive the comparison result signal output from the output end of the comparator.

4. The data receiving circuit of claim 3, wherein the first voltage dividing module comprises a second resistor, the voltage reduction module comprises a diode, and the second voltage dividing module comprises a third resistor.

5. The data receiving circuit of claim 3, wherein the filtering module comprises: a fourth resistor and a third capacitor;
   a first end of the fourth resistor is connected to the input end of the filtering module, and a second end of the fourth resistor is connected to the output end of the filtering module; and a first end of the third capacitor is connected to the output end of the filtering module, and a second end of the third capacitor is connected to the ground end of the filtering module.

6. A data transferring apparatus, comprising a data transmitting circuit and a data receiving circuit, wherein, the data transmitting circuit comprises: a first power supply interface configured to provide a first direct voltage, a second power supply interface configured to provide a second direct voltage, a transmitting interface, a master control chip, a transformer, a current limiting module, a first capacitor and a switch module; in which, a first end of a primary coil of the transformer is connected to the first power supply interface, a second end of the primary coil of the transformer is connected to a first end of the current limiting module and a first end of the first capacitor respectively, a first end of a secondary coil of the transformer is connected to the second power supply interface, and a second end of the secondary coil of the transformer is connected to the transmitting interface; and a second end of the current limiting module and a second end of the first capacitor are connected to an input end of the switch module; or, the first end of the primary coil of the transformer is connected to the first end of the current limiting module and the first end of the first capacitor respectively, the second end of the current limiting module and the second end of the first capacitor are connected to the first power supply interface, the second end of the primary coil of the transformer is connected to the input end of the switch module, the first end of the secondary coil of the transformer is connected to the second power supply interface, and the second end of the secondary coil of the transformer is connected to the transmitting interface; an output end of the switch module is grounded, and a control end of the switch module is connected to the master control chip; the master control chip is configured to transmit a control signal to the control end of the switch module when the data transmitting circuit transmits a data signal to the transmitting interface; and the switch module is configured to switch on or off a circuit path between the input end and the output end of the switch module when receiving the control signal transmitted by the master control chip; and the data receiving circuit comprises: a receiving interface, a first voltage dividing module, a voltage reduction module, a second voltage dividing module, a second capacitor, a filtering module, a comparator, and a master control chip; in which, a first end of the first voltage dividing module and a first end of the second capacitor are connected to the receiving interface; a second end of the first voltage dividing module and a second end of the second capacitor are connected to a first common connection end, the first common connection end is connected to an input end of the filtering module, an output end of the filtering module is connected to a negative input end of the comparator, and a ground end of the filtering module is grounded; the first common connection end is further connected to an input end of the voltage reduction module: an output end of the voltage reduction module is connected to a second common connection end, and the second common connection end is connected to a positive input end of the comparator; the second common connection end is further connected to a first end of the second voltage dividing module; a second end of the second voltage dividing module is grounded; the comparator is configured to compare a voltage of the positive input end with a voltage of the negative input end when the data receiving circuit receives a data signal through the receiving interface, and to output a comparison result signal to the master control chip through an output end of the comparator; the master control chip is connected to the output end of the comparator, and configured to receive the comparison result signal output from the output end of the comparator.

7. The apparatus of claim 6, wherein the transmitting interface and the receiving interface are located in one interface.

8. The apparatus of claim 6, wherein the transmitting interface is separated from the receiving interface.

9. The data transmitting circuit of claim 1, wherein the data transmitting circuit is included in a data transmitting apparatus.

10. The data receiving circuit of claim 3, wherein the data receiving circuit is included in a data receiving apparatus.

* * * * *